US005737024A

United States Patent [19]
Chikira

[11] Patent Number: 5,737,024
[45] Date of Patent: Apr. 7, 1998

[54] SYSTEM FOR STORING COMPUTER DATA USING A VIDEO TAPE RECORDER

[75] Inventor: Masakazu Chikira, Louisville, Colo.

[73] Assignee: Storage Technology Corporation, Louisville, Colo.

[21] Appl. No.: 409,153

[22] Filed: Mar. 23, 1995

[51] Int. Cl.[6] .................................................. H04N 7/01
[52] U.S. Cl. .......................... 348/441; 348/461; 348/463; 360/48
[58] Field of Search .................................. 348/441, 460, 348/461, 465, 466, 467, 468, 463; 358/335; 360/32, 15, 48; 364/240, 242.31, 242.6, 242.92, 248.2, 259, 259.9; 371/40.1; 386/84, 116; H04N 7/01, 11/02

[56] References Cited

U.S. PATENT DOCUMENTS

| | | | |
|---|---|---|---|
| 4,135,213 | 1/1979 | Wintfeld | 348/473 |
| 4,495,623 | 1/1985 | George et al. | 371/38 |
| 4,530,048 | 7/1985 | Proper | 364/200 |
| 4,652,944 | 3/1987 | Tindall | 360/37.1 |
| 4,723,181 | 2/1988 | Hickok | 360/72.2 |
| 5,333,810 | 8/1994 | Hoge et al. | 242/332.4 |
| 5,410,546 | 4/1995 | Boyer et al. | 371/37.1 |

OTHER PUBLICATIONS

Houtekamer, Gilbert E. & H. Pat Artis, *MVS I/O Subsystems: Configuration Management and Performance Analysis*, McGraw-Hill, Inc. 1993, pp. 40-47, 158.

*Primary Examiner*—Michael H. Lee
*Attorney, Agent, or Firm*—Brooks & Kushman, P.C.

[57] ABSTRACT

A system for converting user data between a computer data format and an NTSC format allows a video tape recorder (VTR) to be used as a data storage system. A buffer organizes the user data into scan group data for data recording from a host computer to the VTR, and separates the scan group data into the user data for data playback from the VTR to the host. The system of the invention receives the scan group data from the buffer and converts the scan group data into the NTSC format video fields for recording by the VTR. The invention also converts the NTSC format video fields into the scan group data for playback of data from the VTR to the host.

15 Claims, 5 Drawing Sheets

SYSTEM FOR STORING COMPUTER DATA USING A VIDEO TAPE RECORDER

BACKGROUND OF THE INVENTION

1. Field of the Invention

The present invention relates to data storage systems, and more particularly to video tape recorders (VTRs) for use as data storage systems.

2. Related Art

The data processing industry stores large amounts of digital data on magnetic tapes. The industry standard for magnetic media storage is the IBM 3480 tape cartridge. The 3480 is a single reel cartridge containing a length of one-half inch wide magnetic tape. Data is currently stored on a 3480 cartridge in an 18 track longitudinal format, typically providing approximately 200 megabytes of data storage capacity.

Automated mass storage systems have been developed for automated handling of a large number of the 3480 cartridges. For example, Storage Technology Corporation of Louisville, Colo., produces the 4400 automated cartridge system (ACS) that is capable of storing up to 6,000 "3480" cartridges. The 4400 ACS has proven to be a cost-effective data storage system. With 6,000 cartridges providing 200 megabytes of storage capacity each, the 4400 ACS has a total capacity of 1.2 terabytes ($1.2 \times 10^{12}$ bytes).

Commonly owned U.S. Pat. No. 5,333,810 and co-pending U.S. patent application Ser. No. 08/060,653, filed May 13, 1993, both of which are incorporated herein by reference, disclose a helical scan tape transport for use with a 3480-style cartridge. Helical scan data format allows more than a 100 times increase in storage capacity as compared with the 18 track longitudinal format. In other words, a helical scan cartridge would have a storage capacity of 25 gigabytes rather than the 200 megabytes of the longitudinal format. At 25 gigabytes per cartridge, each 4400 ACS would provide a total storage capacity of 150 terabytes. Thus, helical scan technology holds promise for increasing the storage capacity of the 4400 ACS by an effect of greater than 100 by simply changing the format with which data is stored in each tape cartridge.

The above-reference patent application Ser. No. 08/060,653 discloses a new helical scan data storage device constructed by converting a commercially available video tape recorder (VTR) into a helical scan data storage device. The patent application Ser. No. 08/060,653 teaches to use the head assembly, the servo controls, and the data path from a commercially available VTR to minimize development costs and to reduce time to market in developing a helical tape transport for use with a single reel cartridge. The resulting helical transport meets the form factor of a Storage Technology Corporation model 4480 (3480-style cartridge) tape transport. Thus, it can directly replace a 4480 tape transport in the 4400 ACS. Therefore, the storage capacity of the 4400 ACS can be increased from approximately 1.2 terabytes to approximately 150 terabytes. This is over a 100 times increase in storage capacity without requiring modification to the 4400 ACS.

The problem with using a VTR as a helical scan data storage device is that the VTR only recognizes digital video data, that is, data according to the National Television Systems Committee (NTSC) standard. The NTSC standard has a different data format and timing format than the user data generated by a host (for example, a computer operating in an IBM or IBM-compatible operating system). Thus, what is needed is an NTSC video format conversion device that will convert the user data of the host into the NTSC format of the VTR.

SUMMARY OF THE INVENTION

The present invention is a system for converting user data between a computer data format and an NTSC format such that a video tape recorder (VTR) can be used as a data storage system. A buffer organizes the user data into scan group data for data recording from a host computer to the VTR, and separates the scan group data into the user data for data playback from the VTR to the host. The system of the invention receives the scan group data from the buffer and converts the scan group data into the NTSC format video fields for recording by the VTR. The invention also converts the NTSC format video fields into the scan group data for playback of data from the VTR to the host.

A write circuit receives computer data format scan groups and converts the scan groups from computer data format to National Television Systems Committee format video fields. A read circuit converts the National Television Systems Committee format video fields to the scan groups in computer data format. The write circuit converts data words of each scan group into data bytes and synchronizes the data bytes with timing requirements of a video tape recorder. The read circuit converts data bytes of the video field into data words and synchronizes the data words with timing requirements of a page buffer memory in the host computer.

The write circuit includes a first FIFO buffer for receiving a first byte of each data word of each scan group; a second FIFO buffer for receiving a second byte of each data word of each scan group; a plurality of latches, coupled to the first and the second FIFO buffers, for pipelining the first and second bytes of each data word; and a multiplexer, coupled to the plurality of latches, for interleaving the first and second bytes of the data words to produce a serial data stream. The read circuit includes a first latch for receiving the data bytes of the video field, for generating a parity bit for each of the data bytes and for adding the parity bit to the data bytes; a second latch for pipelining the data bytes to produce data words; and a FIFO buffer for receiving the data words and for providing the data words to the page buffer memory.

The controller controls the write circuit so that the write circuit counts the number of bytes of each scan group; and writes the bytes of each scan group to a corresponding valid line of the National Television Systems Committee format video field. The controller controls the read circuit so that the read circuit identifies valid lines of each video field; counts bytes of the valid lines to determine an end of each valid line; counts the valid lines to determine an end of each video field; and writes each valid line of each video field to a corresponding scan group.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific part numbers and configurations are discussed, it should be understood that this is done for illustrative purposes only. A person skilled in the art will recognize that other components and configurations may be used without departing from the spirit and scope of the invention.

Figure 1:
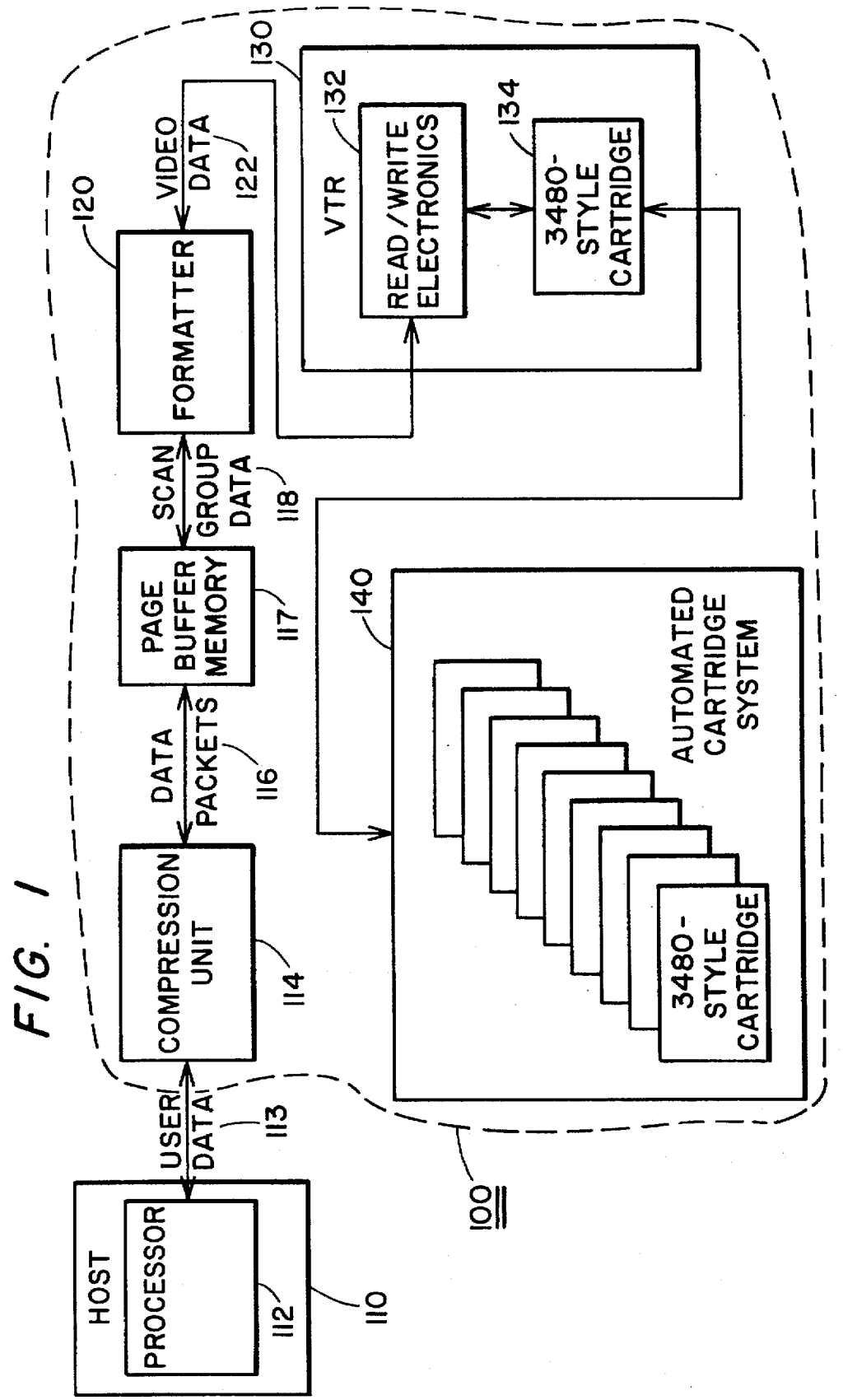
FIG. 1 illustrates a block diagram of a helical scan data storage system.

FIG. 1 illustrates a block diagram of a helical scan data storage system 100. The helical scan data storage system 100 is connected to a host 110 (for example, a computer operating in an IBM or IBM-compatible operating system). The helical scan data storage system 100 includes a compression unit 114, a page buffer memory 117, a formatter 120, a VTR 130, and an automated cartridge system 140 (for example, a 4400 ACS). The page buffer memory 117 is described in detail in commonly owned, allowed U.S. patent application Ser. No. 08/146,531, titled "Apparatus and Method for CRC Computation Over Fixed Length Blocks Containing Variable Length Packets of Data Received Out of Order," which is incorporated herein by reference as if reproduced in full below. The host 110 further comprises a processor 112. The VTR 130 further comprises read/write electronics 132 and a 3480-style cartridge 134. Data transfer for the helical scan data storage system 100 is now described.

For recording of data using the VTR 130, the processor 112 sends user data 113 to the compression unit 114. The user data 113 is in a common data format standard such as ESCON or SCSI (see G. E. Houtekamer and H. P. Artis, *MVS I/O Subsystems*, McGraw-Hill, Inc., 1993). The compression unit 114 compresses the user data 113 into data packets 116 and sends them to the page buffer memory 117. The compression unit 114 is an optional device that provides for data compression. The page buffer memory 117 formats the data packets 116 into scan group data 118. The formatter 120 then formats the scan group data 118 into video data 122 in the NTSC format as required by the VTR 130. The video data 122 is then processed by the read/write electronics 132 and stored on the 3480-style cartridge 134. The read/write electronics 132 process video data 122 as if it were from a video source. The read/write electronics 132 further provides for error correction of the video data 122. The 3480-style cartridge 134 can then be returned to the ACS 140.

For playback of data using the VTR 130, data is transferred in a similar but reversed manner from the recording path. First, the ACS 140 loads the 3480-style cartridge 134 into the VTR 130. Next, the read/write electronics 132 reads the video data from the 3480-style cartridge 134. The formatter 120 then formats the video data 122 into scan group data 118. The page buffer memory 117 then formats the scan group data 118 into data packets 116. The compression unit 114 decompresses the data packets 116 into user data 113 and sends it to the processor 112.

As stated above, the page buffer memory 117 is described in the '531 application. The page buffer memory 117 provides scan group data 118 to the formatter 120. The formatter 120 formats scan group data 118 to video data 122 for recording of data; and video data 122 to scan group data 118 for playback of ,data. During recording of data, the page buffer memory 117 receives data packets 116 from the compression unit 114 (which compresses user data 113 from the host 110 into data packets 116) and assembles the data packets 116 into scan group data 118, in preparation for transmission to the formatter 120. The formatter 120 then formats the scan group data 118 to video data 122 for recording of data by VTR 130. Similarly, during playback of data, the formatter 120 formats video data 122 to scan group data 118. The page buffer memory 117 then formats the scan group data 118 into data packets 116 for transmission to the compression unit 114. The compression unit 114 decompresses the data packets 116 to user data 113 and sends it to the host 110. Thus, the page buffer memory 117 and the formatter 120 enable compatibility between the host 110 and the VTR 130.

In the preferred embodiment, the VTR 130 is a commercially available Panasonic Model D350 digital VTR that has been modified, in accordance with the teachings of the above-referenced U.S. Pat. No. 5,333,810 and U.S. patent application Ser. No. 08/060,653, for use as a helical data storage system. It should be noted that other commercially available VTRs could also be used as helical data storage systems according to the method described below. As a result, the data storage capacity of existing systems, such as the 4400 ACS, can be vastly increased without the need for designing and developing a new helical deck for the host 110.

The page buffer memory 117 of the '531 application provides scan group data 118. The scan group data 118 and the video data 122 have different data format and timing requirements. Thus, the formatter 120 provides an interface between the page buffer memory 117 and the VTR 130 to enable compatibility between the host 110 and the VTR 130. The formatter 120 formats scan group data 118 to video data 122 for recording of data from the page buffer memory 117 to the VTR 130; and video data 122 to scan group data 118 for playback of data from the VTR 130 to the page buffer memory 117. The data format and timing requirements of the page buffer memory 117 and the VTR 130 are now described with reference to the figures.

Figure 2:
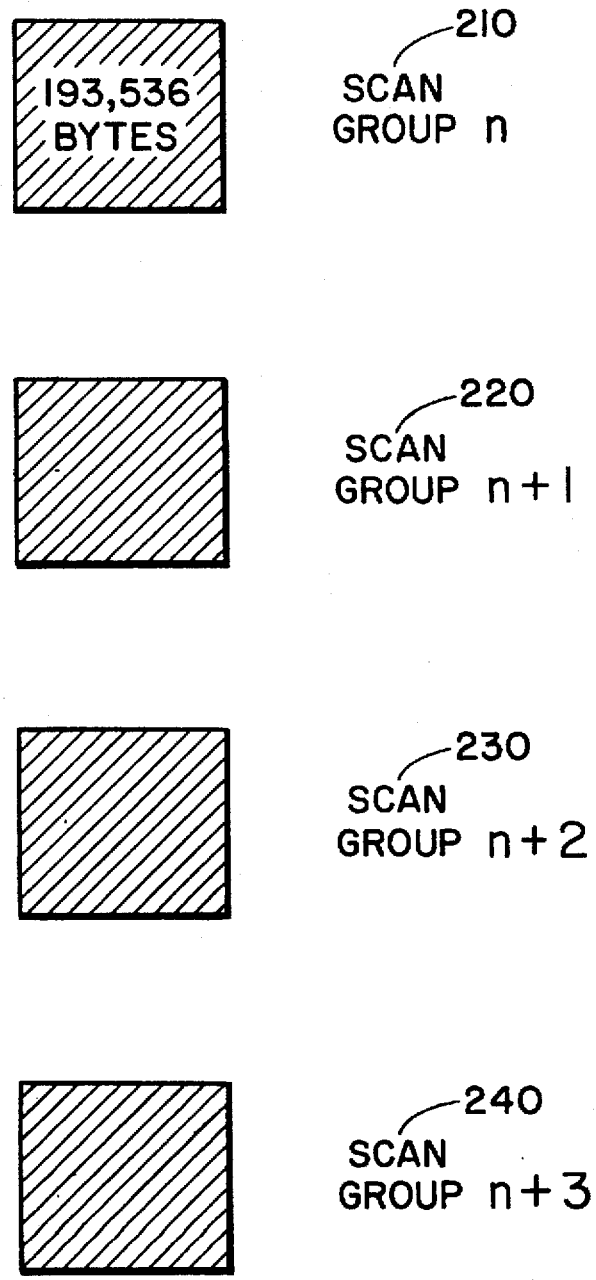
FIG. 2 illustrates scan group data of the page buffer memory.
Figure 3:
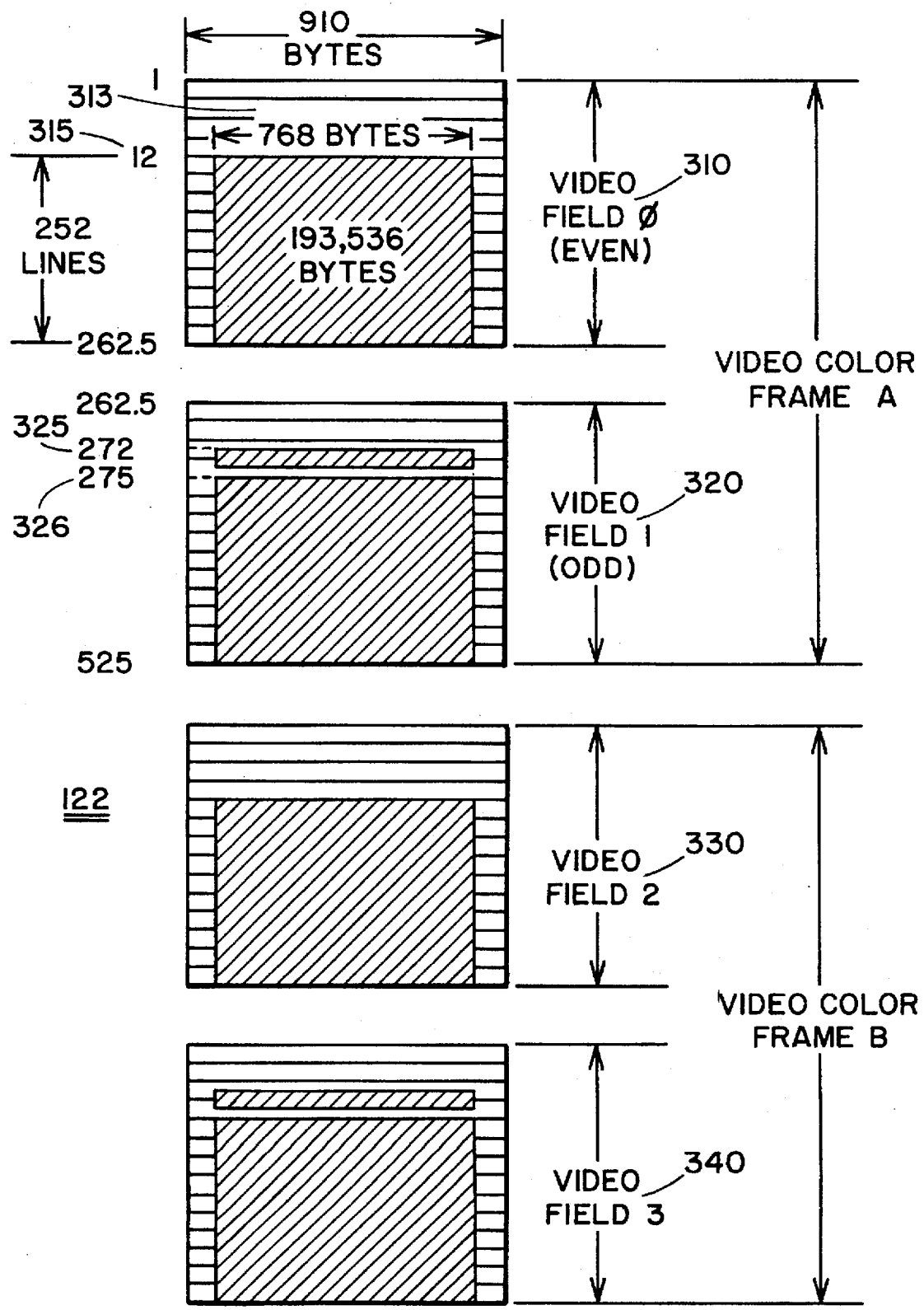
FIG. 3 illustrates video data of the VTR.

FIG. 2 illustrates the scan group data format 118 of the page buffer memory 117, and FIG. 3 illustrates the video data format 122 of the VTR 130. The formatter 120 is required to recognize the video fields and their associated line-timing requirements in formatting the scan group data 118 and the video data 122 between the page buffer memory 117 and the VTR 130. The page buffer memory 117 defines the smallest data block as a scan group 210, which is equivalent to a single video field 310 of the VTR 130 without the timing requirements of the NTSC. Each scan group 210, 220, 230, and 240 contains 193,536 bytes of scan group data. The scan groups 210, 220, 230, and 240 must be converted to video fields 310, 320, 330, and 340, respectively, according to the NTSC standard as discussed below in order to be recognized by the VTR 130.

Referring to FIG. 3, the VTR 130 defines the smallest data block as video fields 310, 320, 330, and 340, which are equivalent to each of the scan groups 210, 220, 230, and 240, respectively, as defined by the page buffer memory 117. However, each video field further consists of timing requirements and blanking bytes according to the NTSC standard. There are two video fields 310 and 320 in a video color frame A, and two video fields 330 and 340 in a video color frame B. Each video field 310, 320, 330, and 340 contains 238,875 bytes of video data (910 bytes×262.5 lines), which includes 193,536 bytes of the scan group data from the page buffer memory 117 and 45,339 bytes reserved for timing requirements and blanking bytes.

Therefore, data from the page buffer memory 117 must be formatted in the video data (NTSC) format 122 as shown in FIG. 3 for recording by VTR 130. Similarly, data from the VTR 130 must be in the scan group data format 118 as shown in FIG. 2 for playback to page buffer memory 117. The timing requirements of the NTSC standard are described next.

The VTR 130 requires that data be in the video data (NTSC) format 122. The video data format 122 requires that horizontal and vertical blanking intervals 313 be added to the scan group data format 118. The horizontal and vertical blanking intervals include UB (user bits/bytes) and VITC (vertical interval time code) lines. The UB and VITC are special machine lines which cannot be used to store any scan group data.

In contrast, the page buffer memory 117 requires that data be in the scan group data format 118. The scan group data format 118 requires that the horizontal and vertical blanking intervals 313 be removed from the video data format 122. The first line in which scan group data 118 can be recognized by the VTR 130 shifts depending on whether the video field is even (0 or 2, as indicated by reference numbers 310 and 330, respectively) or odd (1 or 3, as indicated by reference numbers 320 and 340, respectively). If the video field number is even, the first line which contains valid data is line 12, as indicated by reference number 315. A valid data line is a line that contains scan group data. This means that lines 1-11 of the even video fields (as indicated by reference numbers 310 and 330) are reserved for the horizontal and vertical blanking intervals 313. Furthermore, since the scan group data 118 is only 768 bytes wide and the video data 122 is 910 bytes wide, the remaining 142 bytes in the video fields are also reserved for the horizontal and vertical blanking intervals 313.

If the video field is odd, as indicated by reference number 320 or 340, the first line which contains valid data is line 272, as indicated by reference number 325. The formatter 120 then skips the following two lines (a function of the formatter 120 is described below), and restarts from line 275, as indicated by reference number 326. In either an even or an odd field, the total number of valid data lines is 252. Thus, the formatter 120 is designed such that it avoids or skips these horizontal and vertical blanking intervals 313 while tracking the valid data lines for data transfer between the page buffer memory 117 and the VTR 130.

The formatter 120 consists of two parts. The first part controls the formatting of the scan group data 118 from a word format to a byte format for data recording from the page buffer memory 117 to the VTR 130, and from a byte format to a word format for data playback from the VTR 130 to the page buffer memory 117. The second part controls the interface timing between the page buffer memory 117 and the VTR 130. The formatter 120 in effect isolates the page buffer memory 117 from the unique timing requirements imposed upon it by the VTR 130 (according to the NTSC standard).

Figure 4:
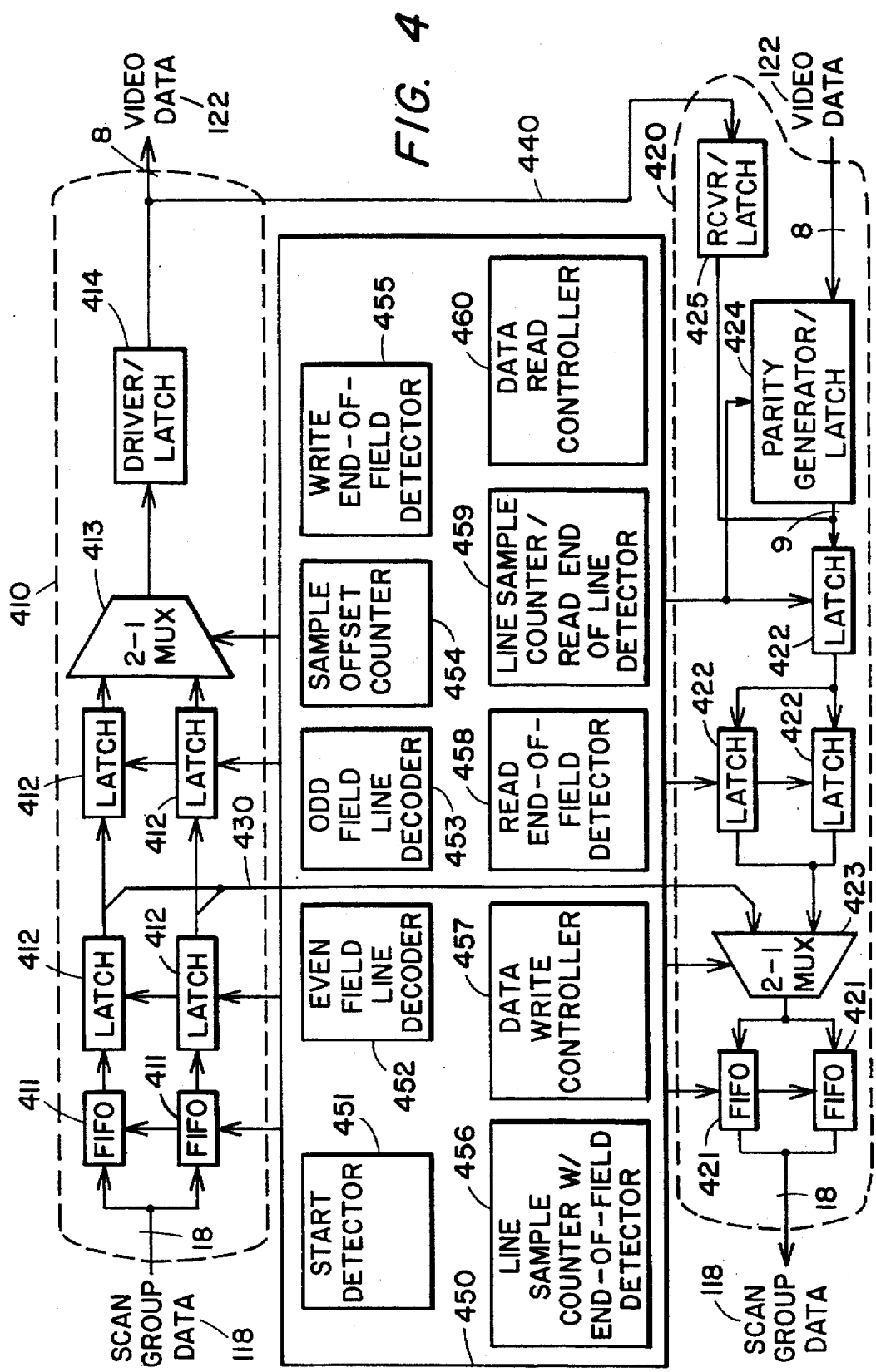
FIG. 4 illustrates a circuit diagram of the preferred circuit implementation of the present invention.

FIG. 4 illustrates a circuit diagram of the preferred circuit implementation of the formatter 120 according to the present invention. The formatter 120 is used for configuring the data format and adjusting the timing format for data recording and playback between the page buffer memory 117 and the VTR 130. The formatter 120 consists of 5 major parts: a write path 410, a read path 420, a formatter control 450, and two loop back paths 430 and 440. The write path 410 provides for data recording from the page buffer memory 117 to the VTR 130. The read path 420 provides for data playback from the VTR 130 to the page buffer memory 117. The formatter control 450 is provided for controlling the write path 410, the read path 420, and the two loop back paths 430 and 440. The formatter control 450 also adjusts the timing requirements between the page buffer memory 117 and the VTR 130. The two loop back paths 430 and 440 are provided for diagnostic purposes.

Write Path

The write path logic 410 is now described. The write path logic consists of a pair of high speed FIFOs (first-in, first-out logic) 411, latches 412, a MUX (multiplexer) 413, and a driver/latch 414. The write data transfer from the page buffer memory 117 to the VTR 130 is continuous. However, no data is transferred during a portion of the video horizontal and vertical blanking intervals 313. The FIFOs 411 are provided to adjust the speed of the data rate between the page buffer memory 117 and the VTR 130. During the period when the horizontal and vertical blanking intervals 313 are needed by the VTR 130, the formatter control 450 disables the FIFOs 411 so that no data is recorded from the page buffer memory 117 to the VTR 130. The latches 412 are configured in a pipeline fashion such that a word stream from the page buffer memory 117 can be transferred into a synchronous byte stream needed for the VTR 130. The word stream is a 16-bit data stream with two parity bits, one parity bit for the first 8 bits (lower byte) and one parity bit for the second 8 bits (upper byte); the byte stream is an 8-bit data stream with one odd parity bit. The first pair of latches 412 are used for storing the scan group data from the FIFOs 411; the second pair of latches 412 are used for storing the scan group data to be selected by the MUX 413 to be recorded by the VTR 130. The MUX 413 is used for converting a word data stream to a byte data stream. Finally, the driver/latch 414 is provided for generating the byte video data stream to the VTR 130. It should be noted that the lower byte of each word is transferred first, then the upper byte follows. The two parity bits of the scan group data word, one for the upper byte and one for the lower byte, are passed through the FIFOs 411 and latched up to the input of the driver/latch 414. The driver/latch 414 then generates the byte-wide video data stream to the VTR 130. The two parity bits from the scan data word are not passed to the VTR 130. Instead, these parity bits are used for diagnostic purposes in the loop-back path 430 to the read path 420. The diagnostic functions, the loop-back path 430, and the read path 420 are described below.

Read Path

The read path logic 420 is now described. The read path logic consists of a parity generator/receiver 424, a receiver/latch 425, latches 422, a MUX 423, and a pair of high speed FIFOs 421. The parity generator 424 receives video data 122 from the VTR 130 in byte format. The parity generator 424 then generates odd parity and attaches it on each byte from the VTR 130. As a diagnostic feature of the formatter 120, this parity generator 424 can be programmed to generate even or odd parity (for diagnostic purposes). Similarly to the write path logic 410, the latches 422 are used to pipeline a byte data stream to a synchronous word data stream from the VTR 130 to the page buffer memory 117. The read data transfer from the VTR 130 to the page buffer memory 117 is also in a continuous mode and, therefore, FIFOs 421 are provided for synchronization. Before placing the read data from the MUX 423 to the input of the Read FIFOs 421, the formatter control 450 converts the byte stream into a word stream by taking the first byte to the lower byte position, and then the next byte to the upper byte position of a word. The constructed word is written to the read FIFOs 421 along with the two odd parity bits, one for the lower byte and one for the upper byte. The read FIFOs 421 then output the word stream to the page buffer memory 117.

Loop Back Paths

The formatter 120 further provides for a diagnostic mechanism in which data can be looped back to the read path 420 to determine whether errors are occurring. The formatter 120 can activate either of loop back paths 430 or 440. The loop-back path 430 allows the formatter 120 to check for data integrity out of the page buffer memory 117 before the scan group data 118 is converted into video data 122. In this mode, each 8-bit data (plus 1 parity bit) from the output of the FIFOs 411 and the first pair of latches 412 in the write path 410 are routed to the MUX 423 in the read path 420. The two 8-bit data (plus 1 parity bit for each byte) are converted into a word data by FIFOs 421. The word data generated by the FIFOs 421 is then compared with the original scan group data 118 to check for data integrity. Data comparison is well known to one of ordinary skill in the art and is done, for example, in the page buffer memory 117.

Similarly, the loop-back 440 allows the formatter 120 to check for data integrity after the scan group data 118 has been converted to the video data 122. In this mode, the video data output from the write path 410 is looped back to the input of the read path 420. The video data is then converted back to scan group data, which is then compared with the original scan group data 118 for data integrity. Thus, the formatter 120 provides for a diagnostic mechanism for checking data integrity both at the input and the output of the formatter 120.

Formatter Control

The formatter control 450 is described next. The primary function of the formatter control 450 is to generate control signals for the write path 410, the read path 420, and the two loop back paths 430 and 440. The preferred implementation of the formatter control 450 is a field programmable gate array (FPGA). Other embodiments such as a microprocessor or a programmable logic array (PLA) can also be used. The formatter control 450 consists of a start detector 451, an even field line decoder 452, an odd field line decoder 453, a sample offset counter 454, a write end of field detector 455, a line sample counter/write end of line detector 456, a data write controller 457, a read end of field detector 458, a line sample counter/read end of line detector 459, and a data read controller 460. The start detector 451, the even field line decoder 452, the odd field line decoder 453, the sample offset counter 454, the write end of field detector 455, the line sample counter/write end of line detector 456, and the data write controller 457 are used for controlling the write path 410. Similarly, the even field line decoder 452, the odd field line decoder 453, the read end of field detector 458, the line sample counter/read end of line detector 459, and the data read controller 460 are used for controlling the read path 420.

Operation of the formatter control 450 in controlling the write path 410 is now described. The start detector 451 detects a start from the page buffer memory 117 and a reference clock from the VTR 130 to trigger the write data sequence from the page buffer memory 117 to the VTR 130. Next, the even field line decoder 452 decodes the starting location of each valid data line of the even video fields. It should be noted again that each video field is equivalent to a scan group plus the timing requirements associated with the NTSC standard. Each video field consists of 252 lines of valid data. Each line contains 768 bytes of data. The even field line decoder 452 sorts out valid lines from invalid ones. Invalid data lines are those lines reserved for the timing requirements of the VTR 130. In even video fields, as described above, the invalid lines are the UB (line 9) and VITCs (lines 10 and 11) where the scan group data cannot be placed. The UB and VITCs lines are special machine lines which cannot be used to store any scan group data. The even field line decoder 452 generates two outputs (flags) (not shown); one to inform the data write controller 457 of the detection of valid lines to be recorded by the VTR 130, and one to enable the sample offset counter 454 and the write end of field detector 455 (these are described below). Similarly, the odd field line decoder 453 detects the starting location of each valid data line in odd fields. Like the even field line decoder 452, the odd field line decoder 453 sorts valid lines from invalid ones. In odd data groups, the invalid lines are the UB (line 271) and VITCs (lines 273 and 274) where the scan group data cannot be placed. The outputs of the odd field line decoder 453 are similar to those of the even field line decoder 452. The outputs (flags) inform the data write controller 457 of the detection of valid lines to be recorded by the VTR 130 and enable the sample offset counter 454 and the write end of field detector 455.

The sample offset counter 454 is now described. There exists two different sample offset values depending on whether the video field is stored in video color frame A or B. These offset values are values required by the VTR 130 to identify the starting point of data entry (data recording) for either video color frame A or B. When the video field is stored in video color frame A, in other words, either video field 0 or 1, the offset value is 116. When the video field is stored in video color frame B, video field 2 or 3, the offset value is 118. Thus, the sample offset counter 454 will count to 116 before data in video color frame A starts recording to the VTR 130. Similarly, the sample offset counter 454 will count to 118 before data in video color frame B starts recording to the VTR 130.

Figure 5:
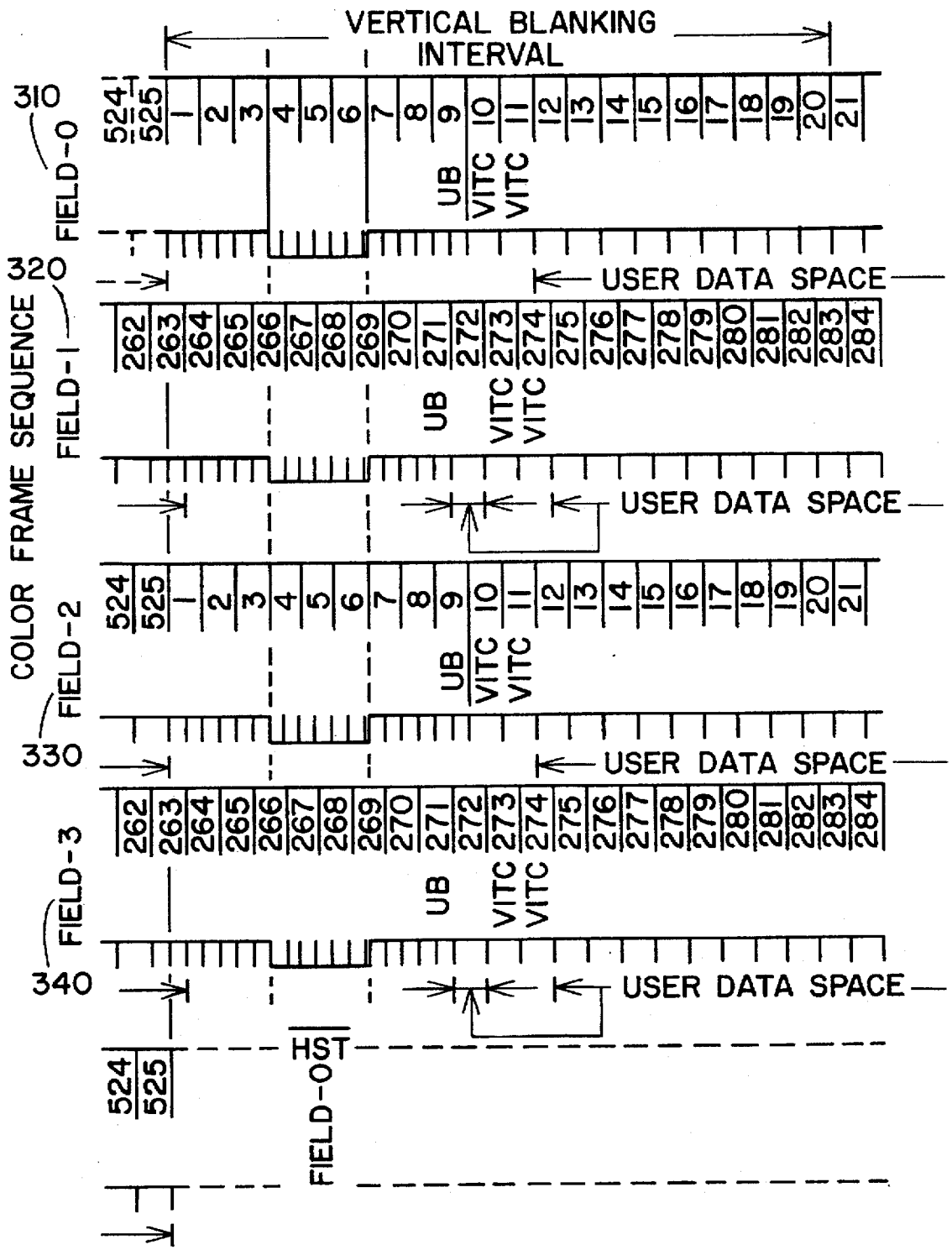
FIG. 5 illustrates an NTSC color frame and user data space.

The write end of field detector 455 is described next. The write end of field detector 455 detects the end of each video field and flags the data write controller 457 that data write for the scan group is completed. The write end of field detector 455 counts 252 lines of valid data in each video field. Referring to FIG. 5, each video field contains 252 lines of valid data. Each even video field, as indicated by reference numbers 310 and 330, contains valid data, shown as "user data space", from lines 12 to 263. Each odd video field, as indicated by reference numbers 320 and 340, contains valid data, shown as "user data space", in line 272 and lines 275 to 525.

The line sample counter/write end of line detector 456 is now described. The line sample counter/write end of line detector 456 detects the start of the line location and counts the number of scan group byte samples in each valid video data line. Once the end of a valid video line is reached, the line sample counter flags the write end of line detector 456. It should be noted that there are 910 samples or bytes in each video data line, of which 768 bytes are valid scan group data and 142 are used for the NTSC timing requirements.

The read end of field detector 458, the line sample counter/read end of line detector 459, and the data read controller 460 for the read path 420 perform the same functions as their counter-part for the write path 410 as described above. The read end of field detector 458 detects the end of each video field and flags the data read controller 460 that data read for the video field is completed. The read end of field detector 458 counts 252 lines in each video field. The line sample counter/read end of line detector 459 detects the start of the line location and counts the number of scan group byte samples in each valid video data line. Once the end of a valid video line is reached, the line sample counter flags the read end of line detector 459. Both the read end of line and the read end of field flags are used by the data read controller 460 to correctly terminate the read data transfer.

An example of data recording from the page buffer memory 117 to the VTR 130 is now described to illustrate the operation of the present invention. First, a request from the page buffer memory 117 for data recording will activate the start detector 451. The start detector 451, in turn, triggers the write path 410. Depending on whether the scan group is even or odd, the corresponding even or odd field line decoder (452 or 453) will then decode the starting location of valid data lines. The even or odd field line decoder notifies the data write controller 457 of the detection of the valid lines and enables the sample offset counter 454 and the write end of field detector 455.

Depending on whether the desired data to be recorded is in video color frame A or B, the sample offset counter 454 will set the offset value accordingly to provide for synchronization with the VTR 130. The write end of field detector 455 will next count the number of lines in each video field to be recorded by the VTR 130. If a whole scan group is to be recorded, then the write end of field detector 455 counts 252 lines in each video field and notifies the data write controller 457 that the end of each video field is reached. Again, depending on which data and how much data is to be recorded, the line sample counter 456 counts the number of desired scan group bytes in each valid line of data to be recorded and flags the write end of line detector 456 when the desired number of scan group bytes have been recorded. Thus, the timing requirements for the VTR 130 are achieved by the method described above where only valid scan group data is transferred from the page buffer memory 117 to the VTR 130 in accordance with the NTSC standard.

An example of data playback from the VTR 130 to the page buffer memory 117 is now described. First, a request from the page buffer memory 117 for data playback will activate the read path 420. Depending on whether the video field is even or odd, the corresponding even or odd field line decoder (452 or 453) will then decode the starting location of valid data lines. The even or odd field line decoder notifies the data read controller 460 of the detection of the valid lines. The read end of field detector 458 will next count the number of lines in each video field to be read by the VTR 130. If a whole video field is to be read, then the read end of field detector 458 counts 252 lines of valid scan group data in each video field and notifies the data read controller 460 that the end of each video field is reached. Note again that there are 262.5 lines of video data in a video field, of which only 252 lines are valid scan group data lines and the rest is reserved for video timing requirements. The video timing requirements are not read by the page buffer memory 117. Depending on which data and how much data is to be read, the line sample counter 456 counts the desired number of bytes in each valid line of data to be read and flags the read end of line detector 456 when the desired number of bytes have been read. Thus, the timing requirements for the VTR 130 are achieved by the system and method described above where only valid scan group data is transferred from the VTR 130 to the page buffer memory 117 in accordance with the NTSC standard.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for converting user data between computer data format scan groups and National Television Systems Committee format video fields, comprising:

first receiving means for receiving scan groups and for converting said scan groups from computer data format to National Television Systems Committee format video fields, said first receiving means including first converting means for converting data words of each scan group into data bytes, and first synchronizing means for synchronizing said data bytes with timing requirements of a video tape recorder; and second receiving means for receiving said National Television Systems Committee format video fields and for converting said National Television Systems Committee format video fields to said scan groups in Computer data format, said second receiving means including second converting means for converting data bytes of each video field into data words; and second synchronizing means for synchronizing said data words with timing requirements of a page buffer memory.

2. The system of claim 1, wherein said first converting means comprises:

a first FIFO buffer for receiving a first byte of each data word of each scan group;

a second FIFO buffer for receiving a second byte of each data word of each scan group;

a plurality of latches, coupled to said first and said second FIFO buffers, for pipelining; said first and second bytes of each data word; and a multiplexer, coupled to said plurality of latches, for interleaving said first and second bytes of said data words to produce a stream of data bytes.

3. The system of claim 2, wherein said first synchronizing means comprises:

means for counting bytes of each scan group; and means for writing said bytes of each scan group to a corresponding valid line of the National Television Systems Committee format video field.

4. The system of claim 3, wherein said second converting means comprises:

first latch means for receiving said data bytes of said video fields, for generating a parity bit for each of said data bytes and for adding said parity bit to said data bytes;

second latch means for pipelining said data bytes with parity to produce data words; and FIFO buffer means for receiving said data words and for providing said data words to said page buffer memory.

5. The system of claim 4, wherein said second synchronizing means comprises:

means for identifying valid lines of each video field;

means for counting bytes of said valid lines to determine an end of each valid line;

means for counting said valid lines to determine an end of each video field; and means for writing each valid line of each video field to a corresponding scan group.

6. The system of claim 5, wherein said means for identifying valid lines further comprises:

means of identifying said valid lines of each even video field; and means of identifying said valid lines of each odd video field.

7. A system for storing user data in a computer data format scan group on a video tape recorder in a National Television Systems Committee format video field, comprising:

organizing means for organizing the user data into a scan group comprising a plurality of data words;

converting means for converting the data words into a stream of data bytes;

synchronizing means for synchronizing the data bytes with timing requirements of the video tape recorder; and writing means for writing the synchronized data bytes to the video tape recorder for storage thereon.

8. The system of claim 7, wherein said converting means comprises:

a first FIFO buffer for receiving a first byte of each data word of each scan group;

a second FIFO buffer for receiving a second byte of each data word of each scan group;

a plurality of latches, coupled to said first and said second FIFO buffers, for pipelining said first and second bytes of each data word; and a multiplexer, coupled to said plurality of latches, for interleaving said first and second bytes of said data words to produce a serial data stream.

9. The system of claim 7, wherein said synchronizing means comprises:

means for counting bytes of each scan group; and means for writing said bytes of each scan group to a corresponding valid line of the National Television Systems Committee format video field.

10. A system for converting data in a National Television Systems Committee format to scan groups in a computer data format, comprising:

first means for converting data bytes of each video field into data words; and second means for synchronizing said data words with timing requirements of a page buffer memory.

11. The system of claim 10, wherein said first means comprises:

first latch means for receiving said data bytes of said video fields, for generating a parity bit for each of said data bytes and for adding said parity bit to said data bytes;

second latch means for pipelining said data bytes with parity to produce data words; and FIFO buffer means for receiving said data words and for providing said data words to said page buffer memory.

12. The system of claim 11, wherein said second means comprises:

means for identifying valid lines of each video field;

means for counting bytes of said valid lines to determine an end of each valid line;

means for counting said valid lines to determine an end of each video field; and means for writing each valid line of each video field to a corresponding scan group.

13. The system of claim 12, wherein said means for identifying valid lines further comprises:

means of identifying said valid lines of each even video field; and means of identifying said valid lines of each odd video field.

14. A system for converting user data from a computer data format scan group to a National Television Systems Committee format video field, comprising:

a first FIFO buffer for receiving a first byte of each data word of each scan group;

a second FIFO buffer for receiving a second byte of each data word of each scan group;

a plurality of latches, coupled to said first and said second FIFO buffers, for pipelining said first and second bytes of each data word;

a multiplexer, coupled to said plurality of latches, for interleaving said first and second bytes of said data words to produce a serial data stream; and synchronizing means for synchronizing said data bytes with timing requirements of a video tape recorder.

15. A system for converting user data from a computer data format scan group to a National Television Systems Committee format video field, comprising:

converting means for converting data words of each scan group into a stream of data bytes;

means for counting bytes of each scan group; and means for writing said bytes of each scan group to a corresponding valid line of the National Television Systems Committee format video field.

* * * * *